Oct. 22, 1929.  S. P. BUCK  1,732,300
POSTAL SCALE
Filed May 16, 1924
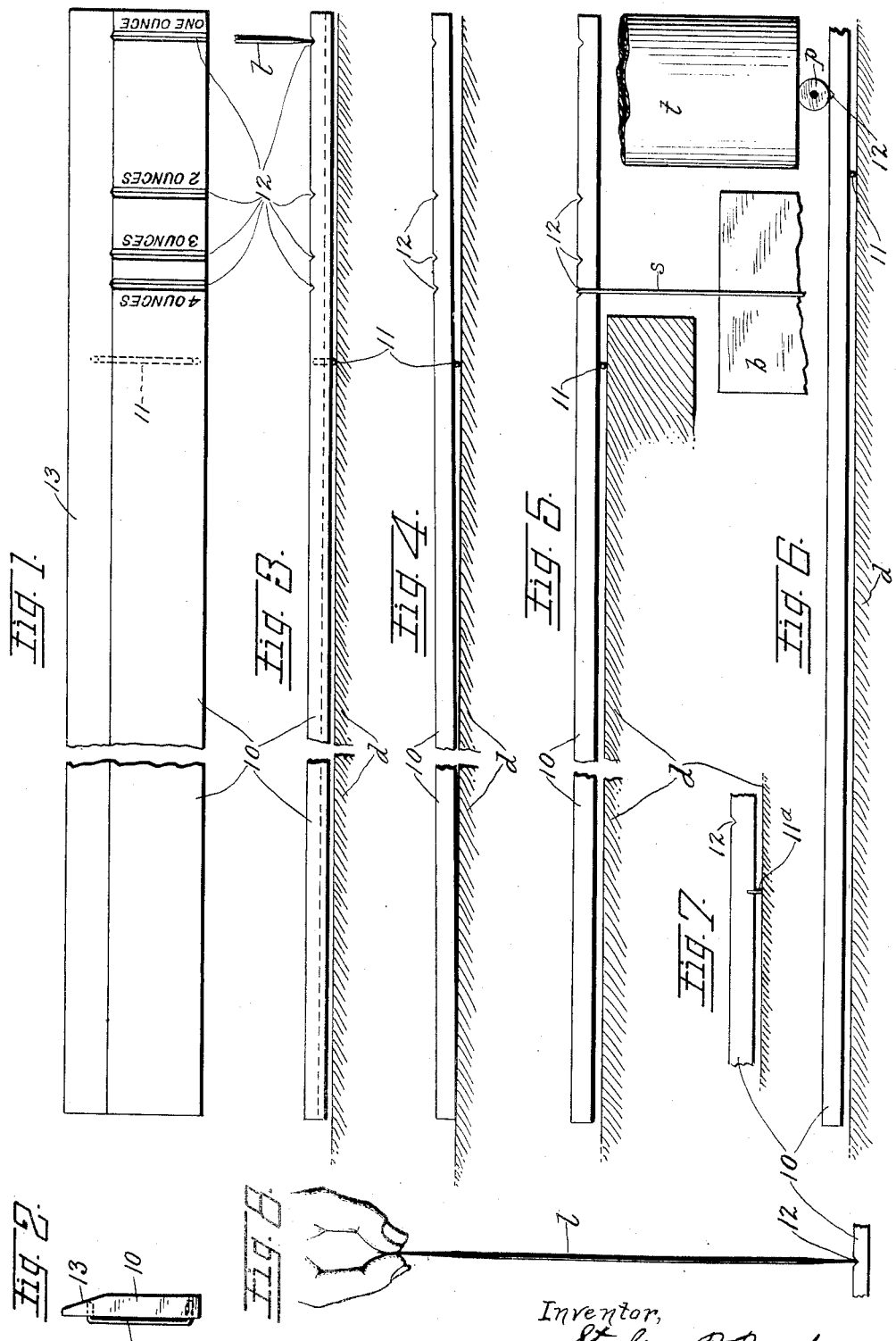
Inventor,
Sterling P. Buck.

Patented Oct. 22, 1929

1,732,300

UNITED STATES PATENT OFFICE

STERLING P. BUCK, OF BALTIMORE, MARYLAND, ASSIGNOR OF ONE-HALF TO LESTER E. BARRETT, OF WASHINGTON, DISTRICT OF COLUMBIA

POSTAL SCALE

Application filed May 16, 1924. Serial No. 713,865.

This invention relates to force measuring scales, and more particularly to postal weighing scales.

The objects of this invention are:

First, to provide an improved postal scale for determining the weight and amount of postage required to carry letters, mailing tubes, small parcel post packages, and for like purposes; which is simple in construction, easy to manipulate, inexpensive to manufacture, and which always gives constant weights quickly and within a very close range of accuracy.

Second, to provide a postal scale which can be quickly and easily formed of an ordinary desk or school ruler, whether it be made of wood or metal, without detracting from its measuring or ruling functions, or from the customary use of such rulers as advertising novelties.

Third, to provide a postal scale that is not only useful for weighing letters and other articles, but which is exceedingly useful as an accessory to a desk, especially because it is durable and comparatively indestructible, and is capable of use as a linear measure, a line ruler, a paper cutter, a paper-weight, a copyist's line-marker (or index) and other uses for which an ordinary postal scale is impractical.

Fourth, to provide a postal scale which is always accurate and uniform, due to the fact that springs are dispensed with that ordinarily vary in tension after use, thereby rendering the scales inaccurate.

The objects mentioned are attained by the postal scale illustrated in the accompanying drawing, in which—

Figure 1, is a top view of the postal scale in accordance wtih this invention; Fig. 2, is an end view of the same; Fig. 3, is an edge view, balanced, a part of a letter being shown in one of the weighing positions; Fig. 4, is an edge view, similar to Fig. 3, but in its normal or unbalanced position; Fig. 5, is a view similar to Fig. 3, but showing a package, suspended from the scale, in one of the weighing positions; Fig. 6, is a view similar to Figs. 3 and 5, except, showing a part of a mailing tube balanced on a pencil, in one of the weighing positions; Fig. 7, is a detail view showing a fulcrum of different form from that shown in Figs. 1 to 6 inclusive; Fig. 8, is a detail view to show how a letter is placed and balanced while being weighed. Fig. 1 and Figures 3 to 7 inclusive show the scale beam with a part broken away.

Similar numerals refer to similar parts throughout the several views. The letter $d$, indicates a desk; $b$, a bundle; $l$, a letter; $s$, a string; $t$ a mailing tube; and $p$, a pencil.

The scale beam 10 is preferably made of a wooden ruler having a beveled edge, as shown in Fig. 2; but the beam need not be made of a ruler, and it need not be wood, for metal or any other suitable material may be used. The beam may be of any convenient length, width, and thickness; but the preferable dimensions are from twelve to fifteen inches in length, one and three-eighths inches in width, and from five-sixteenths to six-sixteenths of an inch in thickness. The fulcrum 11,shown best in Fig. 2, consists of a staple formed of a piece of wire, approximately one-sixteenth of an inch in diameter, one and one-eighth inches long, bent at right angles one-eighth of an inch from each end to form two prongs or legs, which are driven in the lower surface of the beam 10, nearer one of its ends than the other, leaving the main or intermediate portion of the staple lying flush and at right angles to the length of the beam. In Fig. 7, the fulcrum $11^a$ is a straight flat wire or strip embedded in the beam 10, at right angles to its length, and which may or may not extend entirely across the breadth of the beam. There are several desirable methods of forming a fulcrum on the beam 10. For example, the inventor has found that the beam is raised sufficiently high and a very desirable fulcrum formed when two small tacks with convex heads are driven in the beam three-quarters of an inch apart and in a straight line across the beam's breadth. It is, therefore, within the scope of this invention to secure the fulcrum to or form it on the beam in any appropriate manner. The series of grooves or indentations 12, are formed on the upper surface of the beam 10, and run in a straight line transversely from one of its longitudinal edges to the other, at proper distances from the fulcrum 11 to form a graduated scale on the short arm of the beam 10, the graduations representing ounces, and progressing from one ounce upwards, the number of graduations being determined by the length and weight of the longer arm of the beam 10. The grooves or indentations 12, are preferably annular or V-shaped as shown in Fig. 1 and Figs. 3 to 8 inclusive, so their downwardly converging sides direct the edges of letters, etc., to the exact position for obtaining their correct weights.

The grooves or indentations 12 have been described and illustrated as being on the upper surface of the beam 10, and the fulcrum 11 as being on its lower surface. When the scale is formed of a ruler used especially for measuring, it may be more desirable to place the fulcrum on the upper or measuring surface of the beam, and the grooves or indentations on its lower surface, thereby permitting the lower surface of the ruler to lie flat on the thing being measured, but inverted for weighing.

In weighing a letter, or the like, the scale is placed on a desk or table with the fulcrum 11, or 11ª, resting on a flat surface. One of the ends of the letter is then placed in one of the grooves or indentations 12, while its upper end is balanced between the thumb and index finger. If the letter fails to tip the beam 10 on its fulcrum 11, or just balances it, the letter does not exceed the weight indicated by the groove or indentation in which it rests; but if it over balances the beam, more postage is required to carry the letter than applies to the groove or indentation in which the letter was weighed, so it should be similarly balanced between the fingers, in grooves or indentations indicating higher weights, until the beam fails to tip, or until it just balances on its fulcrum.

Bundles or packages having no thin supporting edge like that of a letter may be weighed, as shown in Fig. 5, by extending the short arm of the beam 10 over an edge of the flat surface of a table or desk $d$, and suspending the bundle $b$, from a string $s$, which is in one of the grooves 12.

Oblong objects, such as mailing tubes, or the like, may be conveniently weighed, as shown in Fig. 6, when $t$, the object to be weighed, is raised from the surface of the beam 10, and its weight made to fall on $p$, a pencil, match stem or toothpick, lying in one of the grooves 12.

It is not intended to limit this invention to the exact construction and arrangement described and illustrated, but changes may be made within the scope of the invention as implied and claimed.

What I claim as my invention and desire to secure by Letters Patent is—

1. A postal scale consisting solely of a straight beam of substantially uniform cross section at all points of its length and formed with a graduated series of V-shaped grooves in its upper surface and near one end for receiving the edges of letters and guiding said edges to exact positions with respect to the ends of the beam, the under side of said beam being provided with a fixed very slightly projecting fulcrum, said grooves being spaced different distances from said fulcrum, so that letters of different predetermined weights resting thereon will counterbalance the opposite end of the beam on the fulcrum.

2. A postal scale consisting solely of a straight beam having narrow grooves each extending at right angles to the beam's longitudinal edges and thus forming a graduated scale on the beam's upper surface and near one end thereof, and a projecting fulcrum normally fixed immovably against the beam's lower surface at a point between said graduated scale and the middle of said beam, said fulcrum comprising a wire staple having its legs embedded in the body of said beam and having its intermediate part extending at right angles to the longitudinal edges of the beam, said grooves adapted to receive edges of letters and being spaced different distances from said fulcrum, so that letters of different pre-determined weights resting thereon will counterbalance the opposite end of the beam on the fulcrum.

In testimony whereof I affix my signature.
STERLING P. BUCK.